April 19, 1960     J. R. GRETZINGER     2,933,192
OIL FILTER
Original Filed Nov. 4, 1948     4 Sheets-Sheet 1
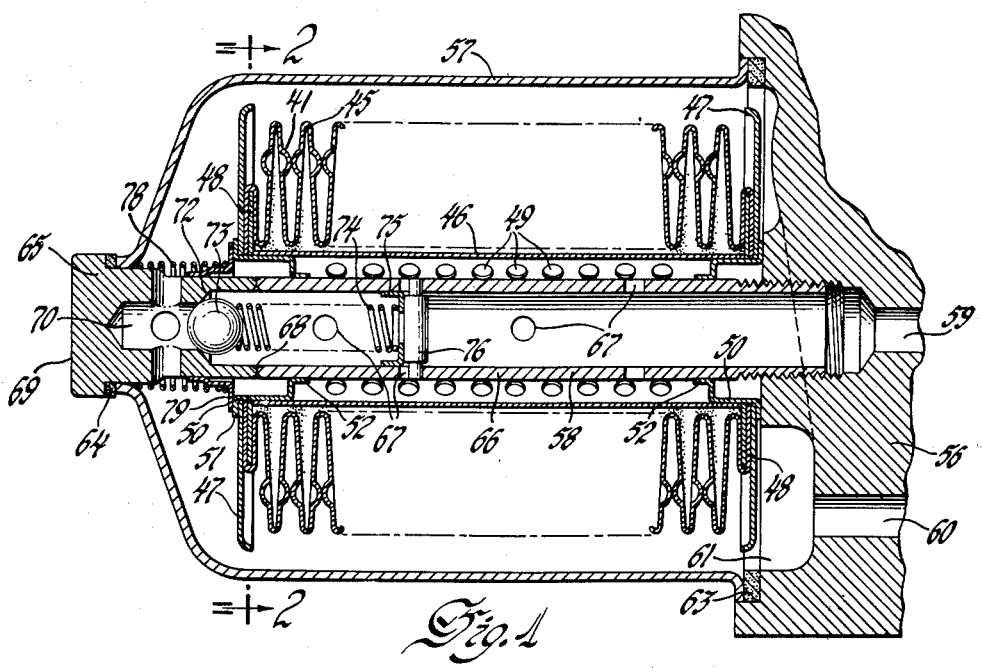
Inventor
John R. Gretzinger
L. D. Burek
Attorneys

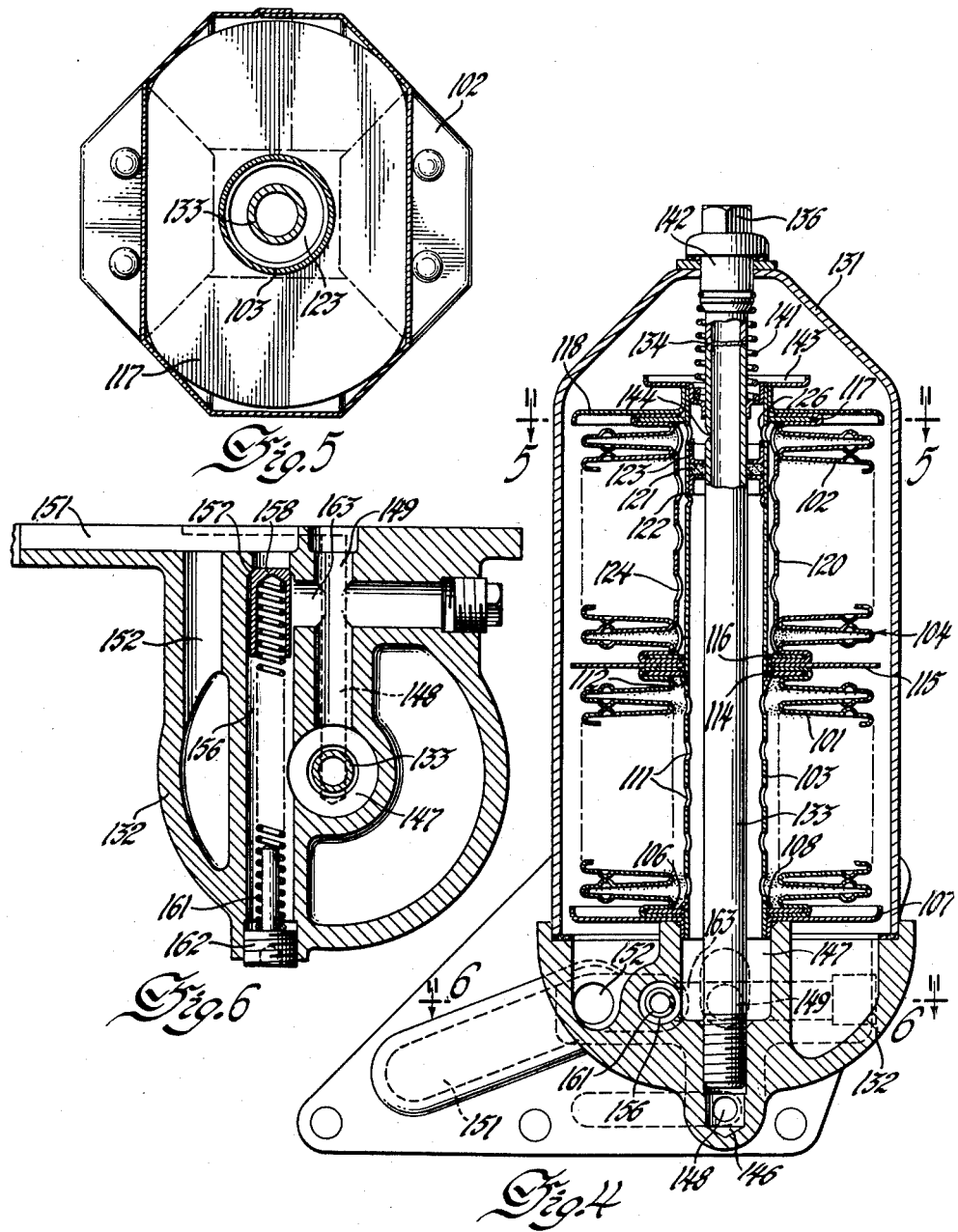

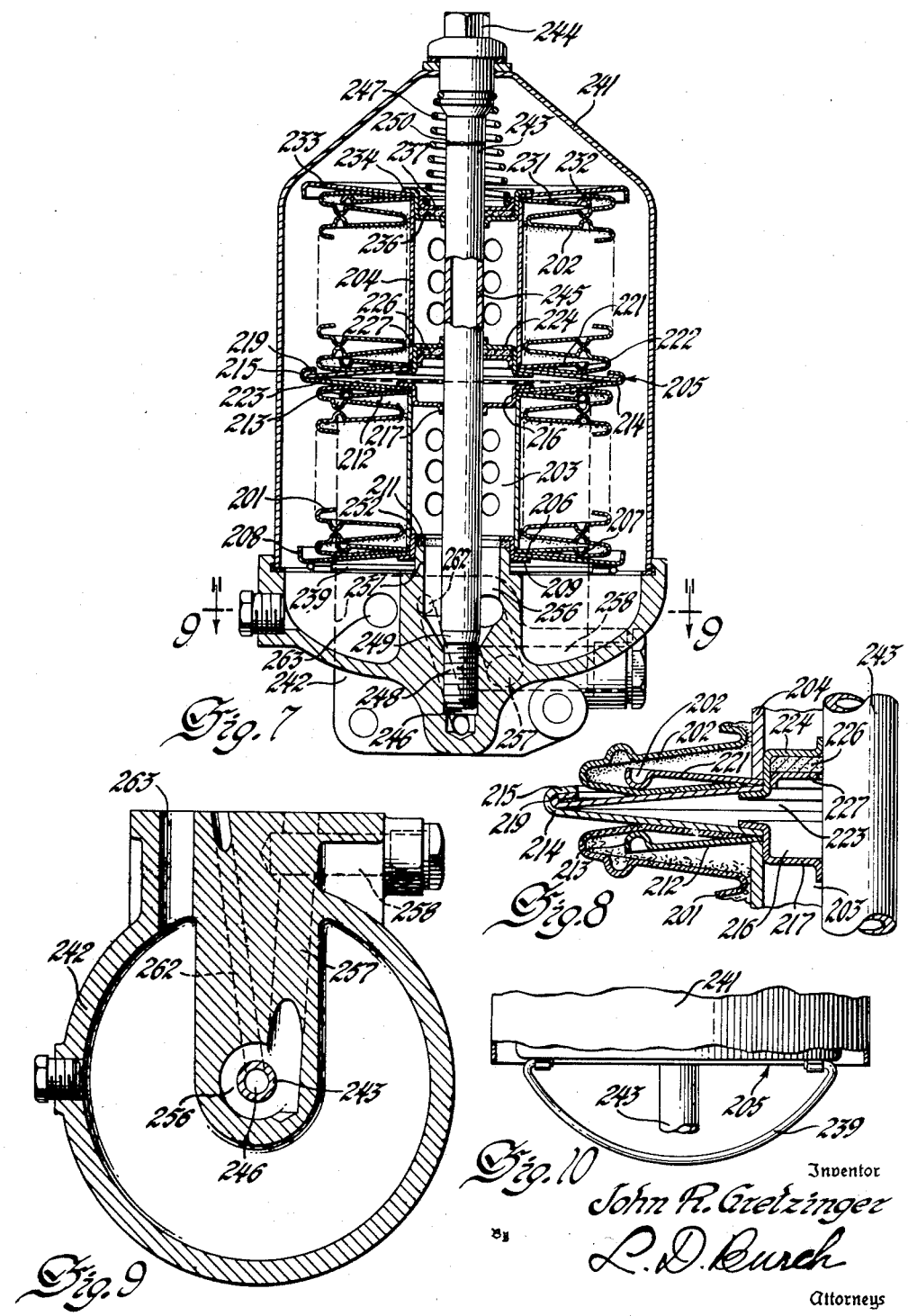

April 19, 1960 J. R. GRETZINGER 2,933,192
OIL FILTER
Original Filed Nov. 4, 1948 4 Sheets-Sheet 4
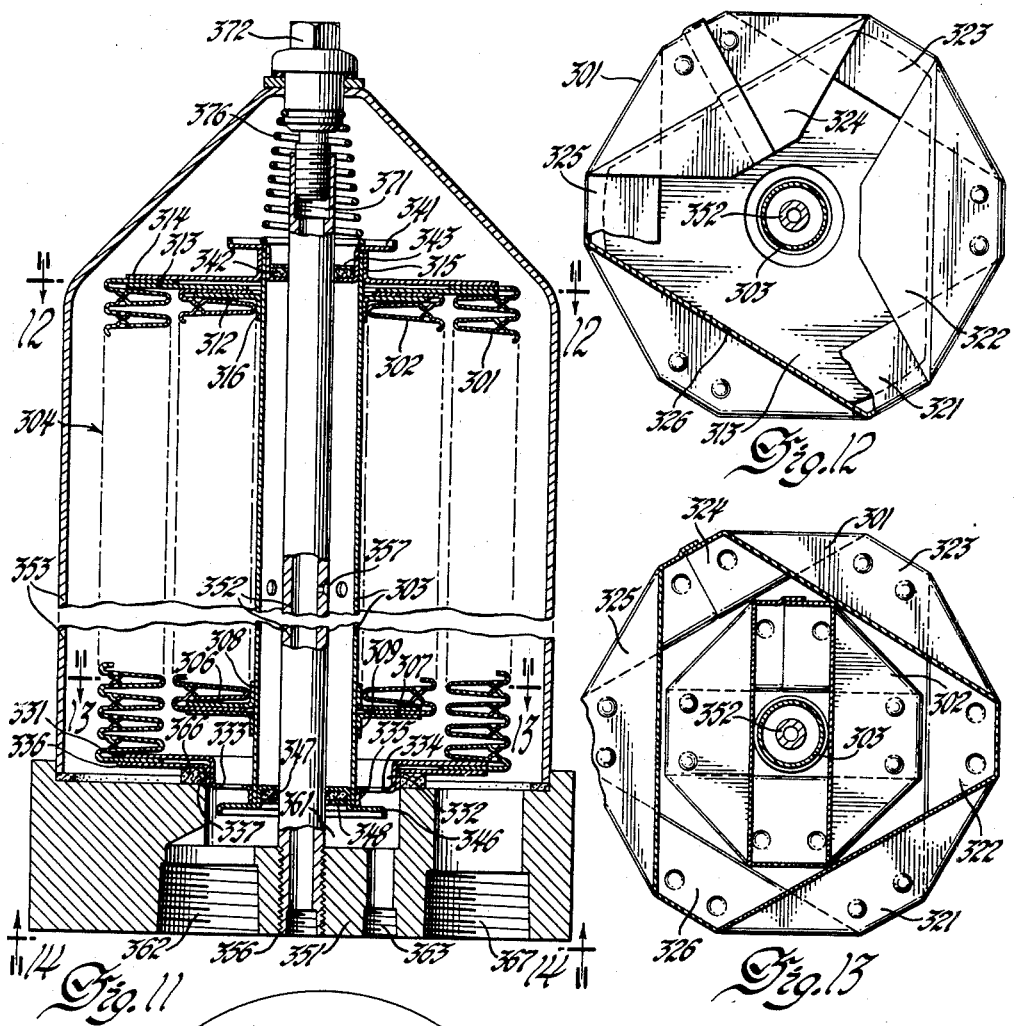
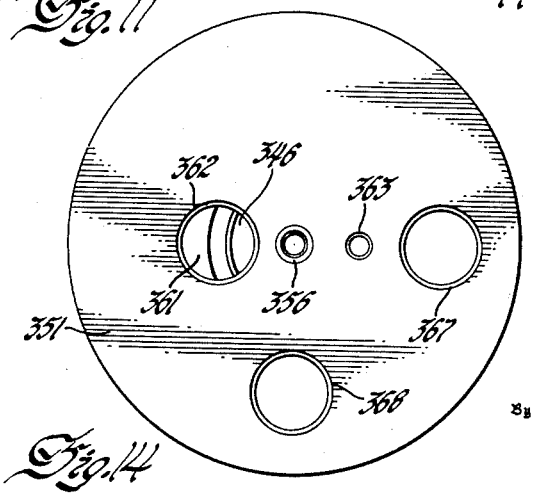
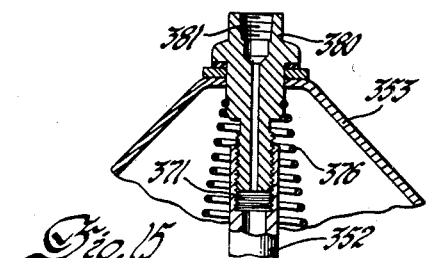
Inventor
John R. Gretzinger
L. D. Burch
Attorneys

United States Patent Office 2,933,192
Patented Apr. 19, 1960

2,933,192
OIL FILTER

John R. Gretzinger, Indianapolis, Ind., assignor to General Motors Corporation, Detroit, Mich., a corporation of Delaware Original application November 4, 1948, Serial No. 58,283, now Patent No. 2,747,744, dated May 29, 1956. Divided and this application October 28, 1955, Serial No. 543,472

18 Claims. (Cl. 210—316)

This invention relates to an oil filtering system and an oil filter for the lubricating oil of internal combustion engines and is a division of the applicant's prior application Serial Number 58,283 filed November 4, 1948, now matured into Patent No. 2,747,744.

The object of the invention is to provide an economical and simplified high capacity filtering system for internal combustion engines.

An object of the invention is to provide a filter system providing both fine and coarse filtering with a disposable one-piece filter unit.

An object is to provide an improved full-flow and part-flow filter unit consisting of a coarse and fine bellows-folded filter element mounted in a housing having separate outlets from both the coarse and fine filters.

An object is to provide an improved full-flow and part-flow filter unit consisting of a coarse filter and a fine filter, and a simplified housing to connect the unit into the engine oil system with separate return lines from the coarse and fine filters.

Further objects of the invention, relating to the construction and arrangement of parts will become apparent from the following description of specific embodiments read in conjunction with the drawings, in which:

Figure 1 is a sectional view of a filter employing the bellows filter unit.

Figure 2 is a cross section with a part broken away of Figure 1 on the line 2—2.

Figure 3 is a fragmentary view of the filter shown in Figure 1 showing a modification.

Figure 4 is a partial cross section of a fine and coarse filter employing the bellows filter units.

Figure 5 is a section of Figure 4 on the line 5—5 with broken-away portions of the pleats shown in dot-and-dash lines.

Figure 6 is a section of Figure 4 on the line 6—6 showing the filter base.

Figure 7 is a section of a modified fine and coarse filter employing the separate bellows filter units.

Figure 8 is a fragmentary enlargement of Figure 7 showing the securing means between the two bellows filter units.

Figure 9 is a section of Figure 7 on the line 9—9 showing the base.

Figure 10 is a partial fragmentary view of Figure 7 showing the housing and filter unit with handle.

Figure 11 is a section of a modified coarse and fine filter employing the bellows filter units in series.

Figure 12 is a section of Figure 11 on the line 12—12 showing the folded end of the coarse bellows filter.

Figure 13 is a section of Figure 11 on the line 13—13 showing the nested bellows filter units.

Figure 14 is a bottom view of the filter shown in Figure 11 on the line 14—14.

Figure 15 is a fragmentary view of Figure 11 showing a modification.

The filtering systems shown in the drawing may employ as the basic surface filter element one or more prism-shaped bellows folded from a single sheet of filter material, such as paper, laminated paper, cloth or wire mesh. Preferably paper impregnated with a resin, such as phenol-formaldehyde, is used because it can be readily folded and then cured to increase the wet strength and stiffness, so that the bellows shape is maintained in use under external pressure.

Though the bellows filter element may be made in various prismatic forms, an octagonal prismatic bellows, which is simple to form and closely approximates a cylinder and thus has a high surface area per unit of volume, is illustrated in Figures 1 and 2.

The bellows is folded from a paper sheet or tube as fully explained in the applicant's Patent No. 2,747,744 and the surface consists of a sheet folded in a series of trapezoidal pleat sections.

The external side surfaces of the bellows are formed by the series of short bases 16, 21, 26 and 32—34 of the trapezoidal pleat sections and the sloping sides or diagonal fold lines 18, 19, 23 and 28 of the trapezoidal pleat sections. The trapezoidal pleat sections 15, 20, 25 and 30—31 are arranged in pairs connected by the short base fold line to form outwardly extending pleats which are referred to by the same reference number as the section thereof. The pleats 15 and 30—31 are oppositely disposed and at the same level. The other pair of pleats 20 and 25 are disposed at right angles and just above and below pleats 15 and 30—31. The diagonal fold lines 18, 19, 23 and 28, which form the intermediate side portions, are sloped to interconnect the adjacent overlain pleats. The inner edges 17, 22, 27 and 33—35 form the edges of a square internal aperture and extend outwardly within the adjacent pleat. It will be seen, referring to Figures 1 and 2, that the folded bellows has the external form of a right hexagonal prism with a square aperture extending centrally through the length of the prism. The longitudinal axis of the bellows is located at the center of the prism and the square aperture or in Figure 1 coaxially with the longitudinal axis of central post 58. Bosses 41 may be embossed in the paper to properly space the pleats. These bosses may protrude from either or both sides of the paper and may be omitted from the end pleat sections as shown. The internal spacing between each pleat section of a pleat is maintained by the adjacent pleat extending between the pleat sections at each end.

This paper bellows surface filter unit may be incorporated into a fluid pressure filter such as a lubricating oil filter suitable for use on internal combustion engines. One form of the invention shown in Figures 1, 2 and 3 may be mounted directly on the engine block or may be connected to a separate base fitting as shown in connection with the modified forms.

The bellows filter unit 45 which has rectangular openings at each end is mounted over a tube 46 with perforations or holes 49 and sealed at the ends by the end plates 47 and clamping plates 48, as shown at the left in Figures 1 and 2. The clamping plate 48 has a generally rectangular shape with rounded ends. The rounded ends are positioned under the pleat sections 20 and 25 and over the inner portion, preferably the inner half, of pleat sections 15 and 30—31. Then the outer portion of these pleat sections are folded over the clamping plate 48 so that the filter material encloses the edge portions, and the material on the outside of the plate 48 may be clamped between the clamping plate 48 and the end plate 47. The clamping plate 48 and the end plate abut the end of tube 46 at both ends and are secured thereto by a bushing 50 fitting within the tube 46. The bushing 50 is secured to the tube 46 preferably by spot welding and has a flange 51 engaging and preferably spot welded to the end plate and clamps both plates to the tube to provide a fluid seal for the end of the bellows unit. The bushing also has a sealing flange 52 which will be described below. The other end of the filter bellows is secured to the tube in the same manner to form the filter element.

During the folding of the bellows and securing the bellows 45 to the tube 46, the resin-impregnated paper is very flexible and soft since the resin is uncured. After the filter element is assembled the resin-impregnated paper is cured to a degree to make it stiff and relatively hard with sufficient strength to support the external pressure of the unfiltered fluid.

Due to the horizontal interlocking arrangement of the pleats and the high strength and rigidity of the resin-impregnated paper when cured, this filter unit can support a large external pressure exerted by the unfiltered fluid. However, additional support may be provided by allowing the internal surface of the bellows filter to bear against the internal support tube.

The filter element is mounted on the engine block 56 in a housing 57 which is secured to the block by the hollow post 58. The block 56 has a threaded fluid outlet passage 59 and an inlet passage 60 leading to the distribution chamber 61. The distribution chamber has a maximum depth at the inlet passage and tapers to a minimum depth at the diametrically opposed portion to evenly distribute the oil as it enters the filter housing. The housing 57 is sealed to the block by the gasket 63 and to the post 58 by the gasket 64.

In order to simplify the manufacture of the central post 58, it is made in two parts, a bolt-like portion 65 recessed at one end and a hollow portion 66 with a plurality of apertures 67. These parts are welded together at 68. The bolt-like portion 65 has a head 69 providing a shoulder to engage the gasket 64 to seal the aperture in the housing 57, and a passage 70 connecting the outside of the post with the interior recess and hollow portion of the post 58. The passage 70 has a seat 72 and ball valve 73 to provide a by-pass valve for the filter. The ball is held in position by a spring 74 and apertured spring seat 75 which abuts on the shouldered retaining pin 76. The shouldered pin is inserted through the apertures 67 and is held in position by the spring 74.

The filter element is held in position by the spring 78 acting through the guide bushing 79 on the filter element. The sealing flanges 52 seal both the top and the bottom of the filter unit to the post. Thus the fluid, such as oil, entering at the inlet 60 will surround and pass through the filter element 45 and apertures 49 in tube 46, and via apertures 67 and the central passage of post 58 enter the outlet 59. If the fluid entering the filter exceeds the capacity of the filter due to excess fluid pressure or clogging of the filter the by-pass valve will open to permit the fluid to flow directly from the inlet to the outlet via the passage in the post.

In Figure 3 a filter of the type shown in Figure 1 with a modified form of seal employed at the outer end of the filter element is shown. The end plate 81 has an upstanding flange about which the end of the bushing 82 is crimped to form a sealing bead 83 which provides a line contact seal. The guide bushing 84 for the spring 78 has a gasket 85 engaging the bead to provide a more secure fluid seal.

The central tube, in addition to supporting the end and clamping plates at each end of the bellows, may also provide internal support to prevent the bellows from collapsing under pressure. In each of the forms of the invention the bellows filter may closely surround the tube so that the tube can provide internal support for the paper bellows. The small initial clearance may be provided to facilitate assembly. The external fluid pressure will immediately force the central portion of the inner edges of the bellows in contact with the tube. The substantially radial position of the pleats will provide high strength to resist radial compression by the fluid. Since each pleat is in contact with the adjacent pleats, the forces tending to laterally displace the pleats will be transmitted to and resisted by the end plates. It will be noted that the two pleat sections forming each pleat are maintained in spaced relation by the adjacent pleats which extend between the pleat at each end thereof. Thus the complete external surface of the filter is exposed to the unfiltered fluid, and suitable internal drainage passages are provided.

A combination full-flow and partial-flow filter may be made by employing two or more bellows filter units. The full-flow filter unit is formed of a coarse filter paper, either a single-ply or a multiple-ply, resin impregnated paper and the partial-flow filter unit 102 is formed of a fine filter paper, either a single-ply or a multiple-ply, resin-impregnated paper.

Both of these filter units are mounted on a tube or tubular support 103 to form a combination filter unit assembly 104. The bottom end of the coarse filter 101 is secured to the tube 103 by clamping plate 106 and bottom plate 107. The clamping plate 106 has the same form as clamping plate 48, and the edges of the bellows filter unit 101 are folded around the clamping plate in the same manner as described above in connection with Figures 1 and 2. The clamping plate 106 abuts against detents 108 on the tube and the central flange on the bottom plate 107 is secured preferably by welding the flange to the tube.

The tube 103 has a series of apertures 111 in the region covered by the coarse filter unit 101 and above the apertures a detent 112. The top clamping plate 114, having the same shape, abuts on detent 112, and the top end of coarse filter unit 101 is folded about the clamping plate in the same manner. A central plate 115 engages and secures this end of coarse filter 101. The lower end of fine filter 102 is then folded about another clamping plate 116 and positioned on center plate 115. A strut tube 120 with apertures 124 is positioned in fine filter 102 and around tube 103, with sufficient clearance to provide for fluid passage between the tubes. The clamping plate 117 is inserted in the top end of fine filter 102 in the same manner, and abuts on the top end of strut tube 120. The top end plate 118 is then positioned in clamping relation and welded to the tube 103 to clamp and secure the top end of fine filter 102 and to exert a clamping force through strut tube 120 to clamp the bottom of fine filter 102 and the top of coarse filter 101. The tube 103 has an annular seal 121 located near the upper end of fine filter 102. The seal 121 is secured by lower retainer 122 which is positioned by a detent and upper retainer 123 which is welded to the tube. Above seal 121 the tube is apertured at 126 to provide a passage for the fine filtered oil.

The combination filter unit assembly 104 and the housing 131 are secured to or mounted on the base 132 by the post 133 which functions as a support and a fluid passage. This post may be formed in two parts and welded together at 134 in the same manner as post 58. The post extends through a central aperture at the top of the housing and has a bolt-like head portion 136 engaging the housing and clamping it to the base. Gaskets may be employed between the head and the housing and the housing and base. A spring 141 is located around the post and positioned by a shoulder 142 on the post. The spring 141 acts on a sealing bushing 143 which has sealing flanges engaging the post 133 and tube 103 to provide a fluid seal at the top of the combination assembly and to force the combination assembly against the base. The post 133 has a metering orifice 144 between seal 143 and annular seal 121.

The base 132 has a central threaded passage 146 and a coaxial and larger bore or recess 147 above the passage. The threaded end of post 133 is screwed into the passage to hold the housing and combination assembly to the base. The passage 146 is connected with the fine filtered fluid outlet 148 and the bore 147 is connected with the coarse filtered fluid outlet 149. The inlet has a lateral passage 151 leading to the passage 152 which connects the inlet to the internal hollow portion of the base. The inlet passage also connects with bypass valve bore 156 having a seat 157 on which valve 158 operates. A spring 161 positioned by stop plug 162 normally holds the valve 158 in closed position against seat 157. The by-pass passage 163 connects the valve bore 156 to the coarse filtered fluid outlet 149 and also extends to the exterior of the casing to provide a cleaning plug.

When this filter is installed in the lubrication system of an internal combustion engine the oil from the pump enters the inlet passages 151 and 152 and fills the housing 131 surrounding both the coarse filter unit 101 and the fine filter unit 102. The spring 141 holds the combination unit in position and the seal bushing 143 seals the top end, while the plate 107 engages the bore 147 in sealing engagement to seal the bottom end. Large quantities of coarse filtered oil pass through the coarse filter unit 101 and apertures 111 to enter the space between the post 133 and tube 103. This space is sealed at the upper end by seal 121 but is opened through bore 147 and outlet 149, so that the coarse filtered oil may pass without appreciable reduction in pressure to the engine lubricating system. The small quantities of fine filtered oil that will pass through the fine filter 102 pass through the apertures 124 and 126 to the space between tube 103 and post 133 between annular seal 121 and bushing seal 143. From this space the oil flows through the metering orifice 144 which limits the flow, into the center of hollow post 133, where it drains under no pressure through passages 146 and 148 to the crankcase. The metering orifice 144 limits the flow through the fine filter 102, and thus maintains the pressure on the coarse filter and the engine lubricating system, even though there is a break or hole in the fine filtering element.

A modified construction of a full and partial flow filter element 205 is shown in Figures 7 to 10. The coarse filter bellows 201 is mounted on a perforated tube 203 and the fine filter bellows 202 is mounted on a similar perforated tube 204. The clamping plate 206 is shaped and positioned within the bottom end of the coarse filter bellows 201, and the bellows pleats are folded in the same manner as described above in connection with clamping plate 48. However, the clamping plate 206 also has a peripheral bead 207 to provide line contact in clamping the paper bellows and to increase the clamping pressure by bulging the clamping plate 206 and end plate 208. The clamping plate and end plate with the bellows therebetween is positioned abutting the end of tube 203 and the fastening bushing 209 is positioned in the tube and secured preferably by welding to both the tube end and the end plate 208. The bushing 209 has a short sealing flange 211 to seal this end of the filter element 205 with the base. The upper end of coarse filter bellows 201 is similarly sealed by a clamping plate 212 with a bead 213 and an end plate 214 secured to the tube 203 by the fastening bushing 216. This bushing 216 has a long sealing flange 217 to engage the central post 243.

The fine filter bellows 202 is similarly clamped at the base by clamping plate 221 with bead 222 and end plate 223 secured to the tube 204 by fastening bushing 224. The bushing 224 has an annular seal 226 held in position by retainer 227 which is secured to the bushing by a press fit or welding. The top end of bellows 202 is sealed to the tube by a clamping plate 231 with bead 232 and end plate 233 which is secured to tube 204 by fastening bushing 234. A flange on bushing 234 supports annular seal 236 which is held in position by retainer 237 secured thereto.

The centrally located end plates 214 and 223 have flanges 215 and 219, respectively, at the outer edge. These flanges 215 and 219 are initially upstanding as on the other end plates 208 and 233, but are crimped over as shown in Figure 8 to secure the combination coarse and fine filter element 205 together. A bail 239 is attached to the bottom of the filter element 205 to facilitate handling in removal and replacement of the filter element.

A housing 241 with a central aperture at the top and the filter element 205 are secured to the base 242 by a hollow post 243 having a solid headed end 244, a metering aperture 245 and a reducing taper 249 at threaded end 248. The headed end 244 and the hollow post part 243 of the post may be formed of two parts welded together at 250 in the same manner as post 58. The post is positioned in the central aperture in the housing 241 and the filter element 205, and is threaded into a threaded passage 246 in the base to secure the housing and filter element to the base. A spring 247 secured to the post by a shoulder engages the seal retainer 237 to hold the element 205 in sealed contact with the base. An annular boss or shoulder 251 surrounding recess 256 fits within the bushing 209, and gasket 252 may be used to provide a better seal between the bottom of the filter and the base.

The base has a counter-bore 256 in the boss 251 coaxial with passage 246. The bore 256 has a larger diameter than post 243 to provide a passage for the coarse filtered fluid, and is connected with the coarse filtered fluid outlet passage 257. This passage 257 is provided with a transverse cleaning passage 258 with a suitable plug. The passage 246 is connected with the fine filtered fluid outlet passage 262. The inlet passage 263 connects directly with the hollow portion of the base 242.

When this filter is used on an internal combustion engine the fluid, such as oil, enters the filter through inlet passage 263 and surrounds both the coarse filter bellows 201 and the fine filter bellows 202. The seal at gasket 252 seals the bottom and seal 236 seals the top of the filter element 205 to prevent entrance of oil to the central space. The oil flows through the coarse filter in large quantities with substantially no reduction in pressure and passes through the perforated tube 203 to the space between the tube and post 243. This space is sealed by flange 217 or seal 226 at the top and communicates through bore 256 to the outlet passage 257. The fine filtered oil after passing through filter bellows 202 and perforated tube 204, enters the space around post 243 limited at the top by seal 236 and at the bottom by seal 226. The oil then flows through the metering orifice 245, which limits the quantity of oil flowing through the fine filter 202 to the center of hollow post 243. The oil drains through the post and passages 246 to outlet passage 262 which is connected to the crankcase of the internal combustion engine.

In the above modifications shown in Figures 1, 4 and 7, where the central post is of one-part construction or two parts welded together, the housing filter element and post is removed as a unit from the base. Referring, for example, to Figure 7, it will be seen that in order to replace the combined filter element 205, the bolt 244 and integrally attached post 243 is unscrewed from the base 242. Then the post 243 with element 205 thereon and housing 241 is removed. Then by grasping the bail 239 the element 205 is removed from the post and a new element is placed on the post and the filter assembled. The threaded end 248 of the post has a reduced diameter and tapered connecting portion 249 to facilitate sliding the seals on the post.

In the above types of combination full-flow and partial-flow filter element, the coarse and fine filter units are arranged in parallel so that only a portion of the fluid passed through each unit. In the modification shown in Figure 11 the coarse bellows filter unit 301 and the fine bellows filter unit 302 are in series and are mounted concentrically on tube 303 to form combination element 304. All the fluid will pass through coarse filter 301, while only a portion will pass hrough fine filter 302.

The fine filter bellows 302 is attached to the tube 303 at a point spaced from the bottom end by a clamping plate 306 and end plate 307. The bellows 302 has an octagonal shape similar to the bellows 45 shown in Figures 1 and 2. Thus the clamping plate 306 has the same shape and is positioned and fixed to the end of the bellows in the same manner as clamping plate 48. The clamping plate 306 and end plate 307 are secured to tube 303 to clamp the end of bellows filter 302 by means such as flanges 308 and 309 respectively. The upper end of bellows 302 is secured between clamping plate 312 and an intermediate clamping plate 313. The clamping plate 312 is secured to the tube 303 by flange 316. The intermediate plate 313 acts as both the end plate for the top end of fine filter 302 and the clamping plate for coarse filter 301.

Referring to Figure 12, a coarse bellows 301 having a dodecagonal prismatic form is employed, since an octagonal prismatic form would leave too much space between the bellows. A hexadecagonal prismatic form which would fit the inner bellows exactly would involve a much more difficult folding operation and would not save much space. The dodecagonal bellows fits closely around the bellows 302 and provides a space for longitudinal fluid flow. This bellows filter 301 is formed in the same manner as filter 45 by employing a fold-line layout similar to the one shown in Figure 1 with six longitudinal series of trapezoidal pleat sections 321 to 326. Each of the pleat sections has the same trapezoidal shape. In the cross sectional view shown in Figure 13 the section plane passes through the inner edge or fold of alternate trapezoidal pleat sections 321, 323 and 325 and the outer edge of the intermediate pleat sections 322, 324 and 326 as indicated by the six-sided polygonal shape of the cut edge of the filter paper. It will be noted that the ends of pleat sections 321, 323 and 325 overlay the intermediate pleat sections in this view.

The end of the bellows 301 has an opening as shown in Figure 13 before the clamping plate 313 is inserted and the pleats folded over to completely enclose the clamping plate. The clamping plate 313 has a generally triangular shape with the apexes cut off to provide flattened portions. The flattened portions of clamping plate 313 fit under pleat sections 321, 323 and 325, and the flat portions are above and inside the inner fold line of the intermediate pleats 322, 324 and 326. The end trapezoidal section of intermediate pleats 322, 324 and 326 are folded over the clamping plate 313, as shown by pleats 322 and 324 in Figure 12. The other intermediate pleat 321 is broken away to show the edge of clamping plate 313.

Referring to Figure 11 the clamping plate 313 with bellows 301 folded about the edge thereof is positioned about tube 303 on top of bellows 302. Then the end plate 314 positioned to clamp the bellows 302 between the clamping plates 312 and 313 and bellows 301 between clamping plate 313 and end plate 314. The flange 315 of the end plate is then secured to the tube.

The bellows filter 301 is sealed at the lower end by a clamping plate 331 having the same general outline as plate 313 and the lower end of the bellows is folded in the same manner as the top end. The clamping plate 331 has an offset flange 332 and shoulder 333 with an annular series of apertures 334 and is secured to tube 303 by flange 335. The end of bellows 301 is clamped to the clamping plate 331 by end plate 336 which is secured by flange 337 to the clamping plate flange 332. A perforated metal hexagonal or cylindrical tube may be positioned inside bellows 301 to provide internal support.

A bushing 341 is positioned in the upper end of tube 303 to provide a spring seat and a seat for seal 342 which is held in the bushing by retainer 343. At the lower end a similar bushing 346 is employed to support seal 347 which is held in position by retainer 348. The retainers are secured in the bushings by suitable means such as a press fit or welding.

The series combination coarse and fine filter element 304 is then positioned on base 351 by post 352 and within container 353. The base 351 has a central passage 356 into which the hollow post 352 is secured by suitable means such as threads. The post has a metering orifice 357 and the hollow center provides a passage for the fine filtered fluid. The bore 361 located concentrically with the passage 356 provides a chamber for the lower end of the combination filter element 304 and for the reception of the coarse filtered fluid. A passage 362 providing an outlet for the coarse filtered fluid and passage 363 for a pressure gauge is connected with bore 361. A gasket 366 provides a seal between the base 351 and the element 304 around the bore 361. Outside of this seal inlet passage 367 in the base supplies oil to the filter units and a valved by-pass passage 368 may be provided to by-pass excessive pressures.

The upper end of post 352 has an internally threaded bore portion 371. A bolt 372, which passes through an aperture in the top of the housing 353, is threaded into bore 371 to secure the housing in position. A spring 376 is compressed between the bushing 341 and a shoulder on bolt 372 to hold the filter element 304 in position.

If it is desired to provide the fine filtered oil inlet passage 356 with an alternative outlet or connection for a pressure gauge, the bolt 380 may be made hollow as shown in Figure 15, to provide a passage 381 connecting with the hollow post or fine-filtered fluid outlet.

In this series combination filter the oil or liquid under pressure enters through inlet passage 367 and surrounds coarse filter bellows 301. The oil is filtered through this filter bellows rapidly and surrounds fine filter bellows 301 at the pressure required for lubrication. The normal supply of lubricating oil under pressure will flow through apertures 334 in clamping plate 331 into bore 361 to outlet 362. A small portion of the oil will flow through fine filter bellows 302 and the apertured tube 303. Since the oil is confined between tube 303 and post 352 and the seals 342 and 347, the oil will flow through metering orifice 357, which will limit the volume of oil that passes through the fine filter and then through hollow post 352 to the outlet passage 356.

In the construction shown in Figure 11 the combined series filter element 304 is replaced by unscrewing the bolt 372 from the post 352 which may be permanently fixed to the base. The bolt 372, housing 353 and spring 376 are then removed as a unit and the filter element 304 may be slipped off the post. Then a new element may be slipped over the post, which may be tapered adjacent the top to facilitate the initial sliding of the seals. The filter element 304 may also be replaced in the same manner as described above in connection with Figure 7 if the bolt 352 is unscrewed at the base 351.

The above examples are illustrative of specific embodiments of the invention. Other modifications within the terms of the appended claims will be apparent to those skilled in the art.

I claim:

1. A combination coarse and fine filter comprising a housing having an inlet passage, a first and a second outlet passage, said first outlet passage terminating in an enlarged chamber in the interior of said housing, said second outlet passage entering said chamber, a hollow post closed at one end and sealed at the other end to said housing around said second passage, a tube positioned around said post and sealed at one end to said housing around said chamber, a sealing bushing between the other end of said tube and said post, a first and a second aperture in said tube, sealing means between said post and tube between said first and second apertures, a hole in the side wall of said post between said sealing means and said sealing bushing, fine filtering means sealed to and covering one of said first and second apertures and coarse filtering means sealed to and covering the other of said first and second apertures.

2. A combined filter element comprising a first bellows filter unit and a second bellows filter unit positioned in end to end relation, said units having outer ends at each end of the filter and inner ends adjacent each other, said bellows filter units having a plurality of transverse pleats and a central axis aperture, a perforated tube positioned in the axial apertures of both of said bellows units, a clamping plate positioned in the end pleats at each end of said bellows units, said tube having a central and end abutment, the clamping plate at the outer end of said first bellows unit engaging said end abutment, a first end plate secured to said tube and clamping the outer end of said first bellows unit to the clamping plate therein, a central plate clamping the inner end of the first bellows to the clamping plate therein contacting said central abutment, the clamping plate on the inner end of the second bellows holding the inner end of the second bellows to the central plate, a strut between the clamping plates at the inner and outer ends of the second bellows unit, and an end plate at the outer end of said second bellows secured to the tube to clamp the second bellows at the outer end and to clamp through the strut the inner ends of both bellows.

3. In a combined coarse and fine filter unit, a housing having an inlet passage and concentrically located inner and outer outlet passages, a hollow post secured within said housing to provide an extension of said inner outlet passage, said post being sealed at the end and having an aperture in the side wall, a unitary fine filter and a coarse filter element supported and positioned on said post, one of said filters being sealed to said post around said aperture, and the other of said filters being sealed around the perimeter of said outer outlet passage.

4. In a combined coarse and fine filter unit, a housing having an inlet passage and concentrically located inner and outer outlet passages, a hollow post secured at one end within said housing to provide an extension of said inner outlet passage, said post being sealed at the other end and having an aperture in the side wall remote from said one end, a tubular support mounted on said post, a pair of spaced seals between said post and tubular support to seal said tubular support to said post on both sides of said aperture and a third seal to seal said tubular support to said housing around said outer outlet passage, said tubular support having a first perforation between said pair of seals and a second perforation between said third seal and the adjacent seal of said pair of seals, a fine filter and a coarse filter positioned around and secured on said tubular support, one of said filters being sealed to said tubular support around said first perforation, and the other of said filters being sealed to said tubular support around said second perforation.

5. In a combined coarse and fine filter, a housing having an inlet passage and concentrically located inner and outer outlet passages, a hollow post secured at one end within said housing to provide an extension of said inner outlet passage, said post being sealed at the other end and having an aperture in the side wall remote from said one end, a filter assembly having a tubular support located about said hollow post having a hole in the wall, a pair of seals between said post and tubular support on opposite sides of said aperture and hole, first, second and third annular supporting plates secured in spaced relation to the outer surface of said tubular support, said first and second plates being sealed to said tubular support on opposite sides of said hole, an annular fine filter and an annular coarse filter positioned around said tubular support, one of said filters being sealed to said first and second supporting plates, the other of said filters being sealed to said first and third supporting plates, said third supporting plate being sealed to said housing about the outer perimeter of said outer outlet passage and said filter assembly having a passage to connect said other of said filters to said outer outlet passage.

6. The invention defined in claim 5 and said filters being longitudinally spaced along said tubular support.

7. The invention defined in claim 5 and said filters being concentrically located about said tubular support.

8. In a combined coarse and fine filter unit, a housing having an inlet passage and concentrically located inner and outer outlet passages, a hollow post secured within said housing to provide an extension of said inner outlet passage, said post being sealed at the end and having an aperture in the side wall, a filter assembly having a tubular support, first, second and third annular supporting plates sealed and secured in spaced relation to said tubular support, an annular fine filter and an annular coarse filter positioned around said support, one of said filters being sealed to said first and second supporting plates, the other of said filters being sealed to said first and third supporting plates, said tubular support being perforated beneath each filter, and said tubular support being sealed to said post above and below said aperture to provide a passage to connect one of said filters to said aperture and to said inner outlet passage, and the end of said tubular support adjacent the other filter being sealed to said housing around said outer outlet passage to provide a passage to connect said other of said filters to said outer outlet passage.

9. In a combined coarse and fine filter unit, a housing having an inlet passage and first and second outlet passages, a hollow post secured within said housing to provide an extension of said first outlet passage, said post being sealed at the end and having an aperture in the side wall, a filter assembly having a tubular support, first, second, and third annular filter supporting plates sealed and secured in spaced relation to said tubular support, an annular fine filter and an annular coarse filter positioned around said support, one of said filters being sealed to said first and second supporting plates, the other of said filters being sealed to said first and third supporting plates, and said filter assembly having a passage to connect one of said filters to said aperture and through said post to said first outlet passage, and a passage to connect the other of said filters to said second outlet passage.

10. In a combined coarse and fine filter unit, a housing having an inlet passage and coaxially located first and second outlet passage means, said second outlet passage means extending within said housing and having an aperture therein, tubular support means mounted on said second outlet passage means, a pair of spaced seals between said tubular support means and second outlet passage means to provide a seal therebetween located on both sides of said aperture, a third seal to seal said tubular support means to said housing around said first outlet passage means, said tubular support means having a first perforation between said pair of seals and a second perforation between said third seal and the adjacent seal of said pair of seals, a fine filter and a coarse filter, one of said filters being connected to said first perforation, and the other of said filters being connected to said second perforation.

11. In a combined coarse and fine filter unit, a housing having inlet passage means and coaxially located first and second outlet passage means, said second outlet passage means including a portion extending within said housing having an aperture therein, tubular support means surrounding said second outlet passage means, first and second sealing means secured to and providing a seal between said tubular support means and said second outlet passage means in spaced relation, a third sealing means sealing said tubular support means to said first outlet passage means, a fine filter and a coarse filter element, means connecting one of said filter elements through said tubular support means between said first and second sealing means and through said aperture to said second outlet passage means, and means connecting the other filter element through said tubular support means between said second and third sealing means to said first outlet passage means.

12. In a combined coarse and fine filter, a housing having an inlet opening and an end wall having coaxially located first and second passages located in said end wall, a tube secured and sealed to said end wall around said second outlet passage and extending within said housing having a closed terminal end and an aperture in the wall thereof, tubular support means supported on said tube over said aperture, a pair of spaced seals between said tubular support means and said tube located on opposite sides of said aperture to provide a seal between said tube and said tubular support means located on both sides of said aperture, a third seal located between said tubular supoprt means and said end wall of said housing surrounding said first outlet passage means to seal said tubular support to said outlet passage means to provide a passage between said tubular support means and said tube connected to said first outlet passage means, said tubular support means having a first perforation between a first pair of seals and a second perforation between said third seal and the adjacent seal of said pair of seals, a fine filter and a coarse filter, one of said filters covering said first perforation, and the other of said filters covering said second perforation.

13. In a combined coarse and fine filter assembly, a housing having an end wall and providing an enclosed chamber, support means including first tube means having a central passage secured and sealed to said end wall and second tube means concentrically supported on and located around said first tube means, said second tube means being sealed to said first tube means at the end remote from said end wall, said second tube means being sealed to said end wall at the other end, a first filter mounted on said second tube means, a second filter mounted on said second tube means, said filters having inner and outer surfaces, said housing having an inlet passage to conduct unfiltered fluid to said chamber in said housing to the outer surfaces of said first and second filters, said end wall having a first outlet passage connected to said central passage of said first tube means and a second outlet passage connected to the passage between said first tube means and said second tube means, said support means including a passage extending from said inner surface of said first filter through said first and second tube means to said central passage in said first tube means, and passage means connecting said inner surface of said second filter to the passage between said first and second tube means.

14. In a coarse and fine filter element adapted for use in a filter housing having a wall, a hollow post secured to the wall and providing a first outlet passage, and a second outlet passage in said wall, the combination of a unitary coarse and fine filter element having tubular support means including longitudinally spaced first, second and third external sealing ring means, said tubular support means having an axially extending central passage, said first and second sealing means extending circumferentially around the external surface of said tubular support means, said third sealing ring means being located at one end of said tubular support means adapted to contact said housing around said second outlet opening, a coarse and a fine filter, one of said filters being secured and sealed to said first and second sealing means, another of said filters being secured and sealed to said first and third sealing means, first passage means including a first aperture in said tubular support means axially between said first and second sealing ring means to provide a passage for filtered fluid passing through said one filter to said central passage, and second passage means including a second aperture in said tubular support means extending through said third sealing ring means, a pair of seals axially spaced on both sides of said first aperture of said first passage means contacting said tubular support means, and one seal located axially between said apertures.

15. In a combined coarse and fine filter assembly adapted for use in a filter housing having a wall, a hollow post secured to the wall providing a first outlet passage and a second outlet passage in the wall, the combination comprising, tubular support means, a pair of annular end plate means secured and sealed to opposite ends of said tubular support means, central annular plate means secured and sealed to said tubular support means between said pair of end plate means, a fine filter element and a coarse filter element, one filter element surrounding said tubular support and secured and sealed at one end to one of said end plate means completely around said tubular support means and at the other end to said central plate means completely around said tubular support means, the other filter element surrounding said tubular support means and secured and sealed at one end to the other end plate means and at the other end to another of said plate means, said tubular support means having a first aperture between said one end plate means and said central plate means, a pair of first annular seals fixed and sealed to said tubular support means on opposite sides of said aperture having an inner sealing surface of smaller internal diameter than said tubular support means, a second annular sealing means on said tubular support means, and a passage extending through a second aperture in said tubular support means between said second annular sealing means and the adjacent one of said pair of seals.

16. The invention defined in claim 15 and said tubular support means being a one piece element, said coarse filter being secured and sealed to one end plate means and said central plate means and said fine filter being secured and sealed to the other end plate means and said central plate means and said passage extending through said tubular support.

17. The invention defined in claim 15 and said tubular support means having two tubular parts in axial alignment, said central plate means comprising an annular plate secured to the adjacent ends of each tubular part, said central plates being secured together to hold said tubular parts in axial alignment, said fine filter being secured and sealed to said one end plate and the adjacent part of said central plate assembly, said coarse filter being secured and sealed to said other end plate and the adjacent part of said central plate assembly, and said passage extending through said tubular support.

18. The invention defined in claim 15 and said coarse filter surrounding said fine filter and being secured and sealed to said one and said other end plate means.

References Cited in the file of this patent

UNITED STATES PATENTS

| | | |
|---|---|---|
| 2,533,266 | Kovacs et al. | Dec. 12, 1950 |
| 2,556,521 | Chase | June 12, 1951 |
| 2,747,744 | Gretzinger | May 29, 1956 |

FOREIGN PATENTS

| | | |
|---|---|---|
| 118,713 | Australia | July 17, 1944 |